(12) United States Patent
Hara

(10) Patent No.: US 8,150,184 B2
(45) Date of Patent: Apr. 3, 2012

(54) METHOD AND APPARATUS FOR ENCODING/DECODING IMAGE, COMPUTER-READABLE PROGRAM THEREFORE, AND INFORMATION RECORDING MEDIUM STORING SAME PROGRAM

(75) Inventor: Junichi Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 757 days.

(21) Appl. No.: 12/314,889

(22) Filed: Dec. 18, 2008

(65) Prior Publication Data
US 2009/0161969 A1 Jun. 25, 2009

(30) Foreign Application Priority Data
Dec. 21, 2007 (JP) ................. 2007-330709

(51) Int. Cl.
*G06K 9/36* (2006.01)
*G06K 9/46* (2006.01)
(52) U.S. Cl. ........................ 382/240; 382/239
(58) Field of Classification Search .......... None
See application file for complete search history.

(56) References Cited

U.S. PATENT DOCUMENTS

| | | | | |
|---|---|---|---|---|
| 5,585,963 A * | 12/1996 | Suzuki | .......... | 386/264 |
| 5,892,850 A * | 4/1999 | Tsuruoka | .......... | 382/240 |
| 6,052,205 A * | 4/2000 | Matsuura | .......... | 358/426.12 |
| 6,665,444 B1 * | 12/2003 | Kajiwara | .......... | 382/240 |
| 7,293,172 B2 | 11/2007 | Nishimura et al. | | |
| 7,319,792 B2 | 1/2008 | Hara et al. | | |
| 7,336,852 B2 | 2/2008 | Nomizu et al. | | |
| 7,352,907 B2 | 4/2008 | Sakuyama et al. | | |
| 7,362,904 B2 | 4/2008 | Hara et al. | | |
| 7,386,175 B2 | 6/2008 | Hara et al. | | |
| 7,394,470 B2 | 7/2008 | Nishimura et al. | | |
| 7,409,060 B2 | 8/2008 | Nomizu et al. | | |
| 7,430,327 B2 | 9/2008 | Kodama et al. | | |
| 7,450,773 B2 | 11/2008 | Nomizu et al. | | |
| 7,456,844 B2 | 11/2008 | Hara | | |
| 7,702,151 B2 * | 4/2010 | Takahashi | .......... | 382/169 |
| 2004/0126029 A1 | 7/2004 | Sakuyama et al. | | |
| 2004/0131262 A1 | 7/2004 | Hara et al. | | |
| 2004/0134978 A1 | 7/2004 | Hara et al. | | |
| 2004/0136597 A1 | 7/2004 | Hara et al. | | |
| 2004/0141651 A1 | 7/2004 | Hara et al. | | |
| 2004/0146160 A1 | 7/2004 | Nomizu et al. | | |
| 2004/0151386 A1 | 8/2004 | Kodama et al. | | |

(Continued)

FOREIGN PATENT DOCUMENTS
JP 2003-189093 7/2003

*Primary Examiner* — Yuzhen Ge
(74) *Attorney, Agent, or Firm* — Harness, Dickey & Pierce, P.L.C.

(57) ABSTRACT

An image encoding apparatus reduces the discontinuation or elimination of thin lines during a transform process including rounding of coefficient data generated by a frequency transform, thereby enabling the ready acquisition of a high-quality reduced image. The image encoding apparatus includes a frequency transform unit configured to frequency-transform an image to generate coefficient data having a low-frequency component and a high-frequency component; a dynamic range control unit configured to add a bit on a least significant bit end of a portion of pixel data of the image that is used for generating the coefficient data of the low-frequency component on a pixel by pixel basis, thereby increasing a dynamic range of the pixel data; and an encoding unit configured to encode the coefficient data generated by the frequency transform unit.

13 Claims, 12 Drawing Sheets

U.S. PATENT DOCUMENTS

| | | |
|---|---|---|
| 2004/0190782 A1 | 9/2004 | Nomizu et al. |
| 2004/0201593 A1 | 10/2004 | Nishimura et al. |
| 2004/0202371 A1 | 10/2004 | Kodama et al. |
| 2004/0208379 A1 | 10/2004 | Kodama et al. |
| 2004/0217887 A1 | 11/2004 | Nomizu et al. |
| 2004/0218817 A1 | 11/2004 | Kodama et al. |
| 2004/0234135 A1* | 11/2004 | Nomizu ................ 382/209 |
| 2004/0252834 A1 | 12/2004 | Nishimura et al. |
| 2004/0252897 A1 | 12/2004 | Hara et al. |
| 2005/0031215 A1 | 2/2005 | Nomizu et al. |
| 2005/0036701 A1 | 2/2005 | Miyazawa et al. |
| 2005/0053239 A1 | 3/2005 | Nomizu et al. |
| 2005/0201624 A1 | 9/2005 | Hara et al. |
| 2006/0171601 A1* | 8/2006 | Shinbata ................ 382/232 |
| 2006/0228033 A1 | 10/2006 | Hara |

* cited by examiner

FIG.5
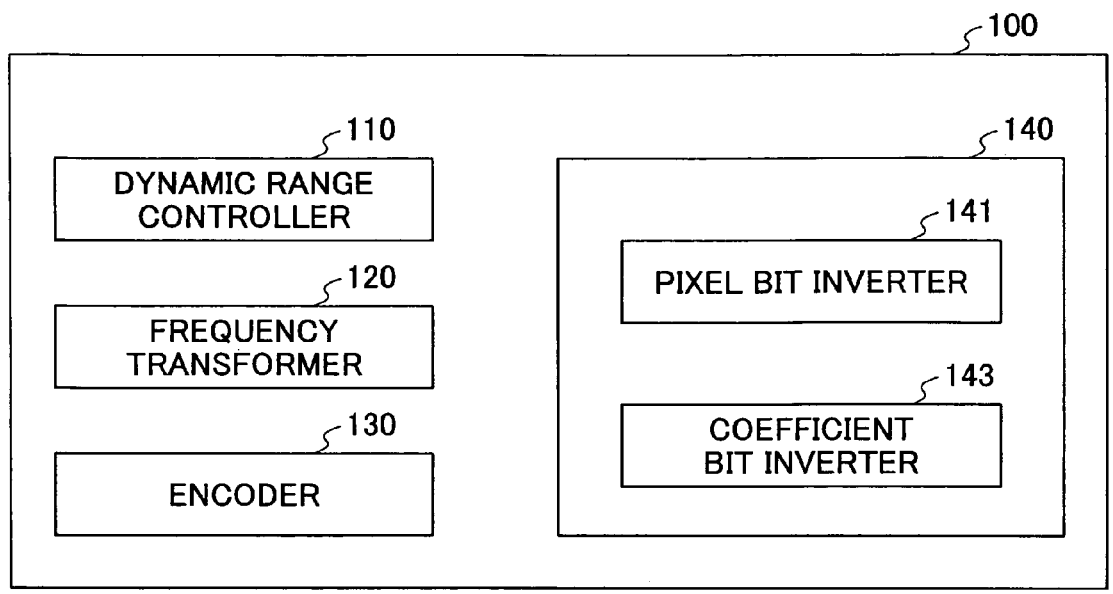
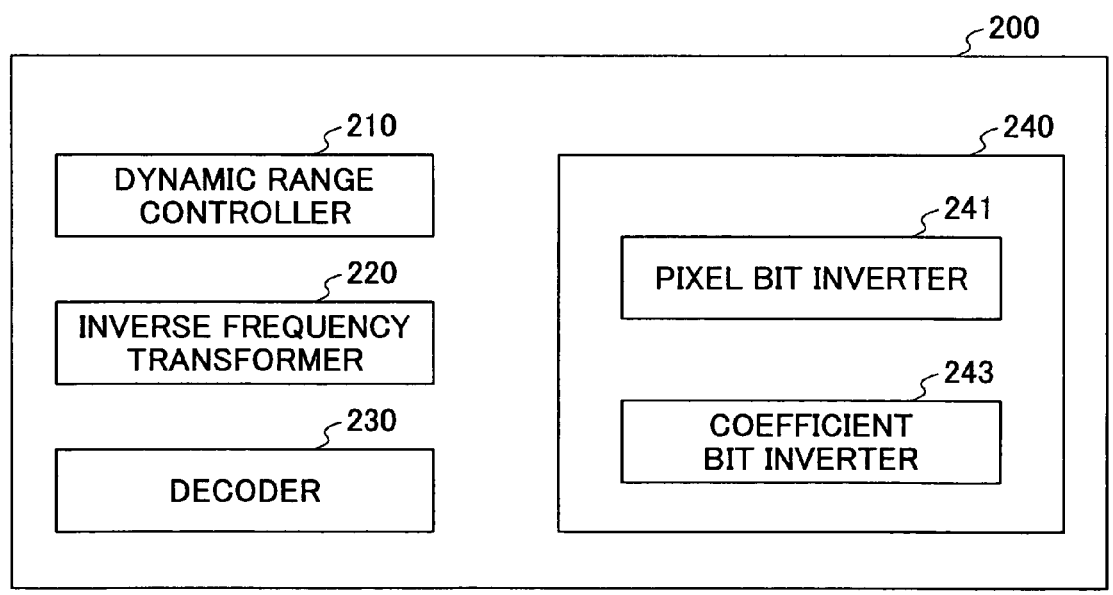

METHOD AND APPARATUS FOR ENCODING/DECODING IMAGE, COMPUTER-READABLE PROGRAM THEREFORE, AND INFORMATION RECORDING MEDIUM STORING SAME PROGRAM

BACKGROUND OF THE INVENTION

1. Field of the Invention

The present invention generally relates to apparatuses and methods for encoding/decoding images, computer-readable programs for encoding/decoding images, and image recording media storing such programs.

2. Description of the Related Art

The improvements in resolution of digital cameras and scanners that have been made over the years have led to an increasing demand for capabilities to handle high-resolution still images. Diverse functions are required of image compression/expansion technologies for facilitating the handling of high-resolution still images. One of the currently most popular image compression/expansion algorithms for high-resolution still images is JPEG (Joint Photographic Experts Group; ISO/IEC10918-1). In recent years, image compression/expansion algorithms that employ discreet wavelet transform ("DWT") for frequency transform are increasingly being used. One example is the JPEG 2000 encoding technology (ISO/IEC15444-1).

One feature of the JPEG 2000 encoding technology (hereafter referred to as "JPEG 2000") lies in its resolution scalability. Resolution scalability is utilized when one desires to view an image by transforming it to a desired image size. The displayed image size of a high-resolution still image may be determined by the resolution (dot pitch) and size of the digital camera or scanner at the time of reading a signal. Once the signal is transformed into data adapted to a predetermined still image format, the image size remains constant unless the data is subjected to a transform process. However, a user may want to view the image at various view sizes or resolutions. For example, the resolution of an LCD monitor installed on a digital camera may greatly differ from the resolution of a display of a personal computer on which the user may wish to view an image taken with the digital camera.

When image data that has been encoded by an encoding system without resolution scalability, such as JPEG, is to be displayed at a desired size, the entire codes need to be once decoded to obtain pixel data, i.e., a bit map, before an enlarging or reducing process can be performed on the data.

Japanese Laid-Open Patent Application No. 2003-189093 discloses a technology relating to an image processing apparatus that correctly distinguishes a character edge and a profile edge of a subject in a photograph region. An appropriate process can be then performed on the individual regions so that a high-quality output image can be obtained.

In contrast, when displaying code data encoded by JPEG 2000 at a reduced size, only a part of the code data can be subjected to a decoding process to generate a bit map. Thus, memory required for the decoding process can be reduced, and the processing time required for the decoding process can also be reduced. Such a decoding process performed on a part of code data to obtain a decoded image with a resolution smaller than that of the original image is hereafter referred to as a "reductive decoding".

In a case of a high resolution black and white image, or when a character region is desired to be saved as monochromatic data separately from the background region, a binary original image is often encoded. This is because binary data, compared with multivalued data, requires less bits for representing a single pixel, so that the total volume of data that needs to be encoded can be reduced.

However, when the binary image is frequency-transformed and then its coefficient data is encoded to generate code data, a problem occurs that discontinuation of thin lines appears upon reductively decoding the code data back to pixel data. This is due to the frequency transform in the process of generating the code data. For example, in JPEG 2000, during the wavelet transform for the lossless encoding of a binary image, a rounding process is performed in order to obtain integers of wavelet coefficients. Thereafter, the data is downsampled at the intervals of two pixels, i.e., at every other pixel. Thus, while there are no problems in regions where continuous pixel values continue, black pixels may be eliminated by the aforementioned rounding process and downsampling in a region in which black thin lines exist among white pixels, for example, due to the scarcity of continuous pixel values, thus leaving the white pixels alone. Such problem is not considered in the aforementioned document.

The above problem also occurs when code data encoded by an encoding method without resolution scalability, such as JPEG or GIF, is decoded and later displayed by reducing its size at the nearest-neighbor points. The discontinuation or severing of the thin lines may be corrected by performing a smoothing process on the original image based on an algorithm such as linear interpolation (such as bi-linear interpolation) or three-dimensional interpolation (such as bi-cubic interpolation).

However, in the case of code data generated by JPEG 2000, when a smoothing process is performed by using all of the data for an image size corresponding to the original image upon reductive decoding, code data with higher resolution than the resolution of the displayed image also needs to be decoded. As a result, the advantage of reductive decoding decreases.

SUMMARY OF THE INVENTION

It is a general object of the present invention to provide an apparatus and method for encoding or decoding an image, a computer-readable program for encoding or decoding an image, and an image recording medium storing such a program, whereby one or more of the aforementioned problems are eliminated.

A more specific object is to provide an apparatus and method for encoding or decoding an image, a computer-readable program for encoding or decoding an image, and an image recording medium storing such a program, whereby the aforementioned severing or elimination of thin lines, which tend to occur in a transform process in which coefficient data generated by a frequency transform is subjected to a rounding process, can be reduced, so that a reduced image of high quality can be readily obtained.

According to an embodiment of the present invention, an image encoding apparatus includes a frequency transform unit configured to frequency-transform an image to generate coefficient data having a low-frequency component and a high-frequency component; a dynamic range control unit configured to add a bit on a least significant bit end of a portion of pixel data of the image that is used for generating the coefficient data for the low-frequency component on a pixel by pixel basis, in order to increase a dynamic range of the pixel data; and an encoding unit configured to encode the coefficient data generated by the frequency transform unit.

The image encoding apparatus of the above embodiment reduces the discontinuation or elimination of thin lines that tend to occur during the transform process including a rounding process on the coefficient data generated by a frequency transform. Thus, the image encoding apparatus can generate code data that enables the acquisition of a high-quality reduced image readily.

Various other embodiments of the present invention may include an image encoding method for carrying out the functions of the various units of the above image encoding apparatus, an image decoding apparatus for decoding the code data generated by the image encoding apparatus, an image decoding method for carrying out the functions of the various units of the image decoding apparatus, a computer-readable program for causing a computer to carry out the image encoding method or the image decoding method, and an information recording medium storing such a computer-readable program.

BRIEF DESCRIPTION OF THE DRAWINGS

FIG. 2 shows an example of binary image in which thin lines have a value 1;

FIG. 3 shows another example of binary image in which thin lines have a value 0;

FIG. 5 shows functional structures of an image encoding apparatus and an image decoding apparatus according to an embodiment;

DETAILED DESCRIPTION OF THE PREFERRED EMBODIMENTS

Hereafter, various embodiments of the present invention are described with reference to the drawings.

Figure 1B:
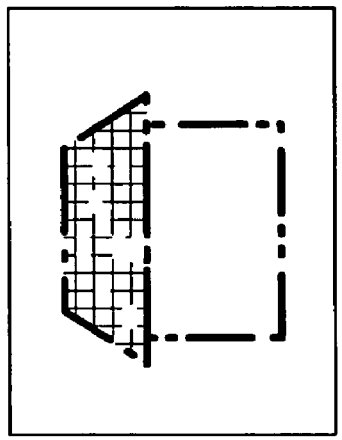
FIGS. 1A and 1B illustrate a problem solved by an embodiment of the present invention.
Figure 1A:
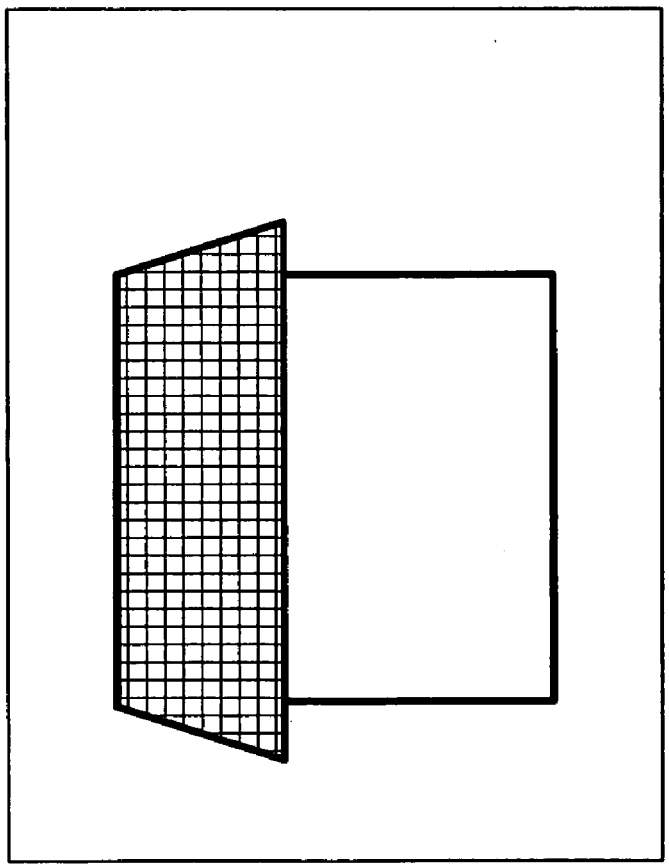

FIGS. 1A and 1B illustrate a problem to be solved by an embodiment of the present invention. FIG. 1A shows an image encoded by an image encoding apparatus according to the present embodiment. In the present embodiment, the image to be encoded may be referred to as an "original image", data generated by encoding the image may be referred to as "code data", and an image obtained by decoding the code data may be referred to as a "decoded image".

The original image shown in FIG. 1A may be composed of binary pixel data. FIG. 1B shows an image obtained by decoding a portion of the code data generated by subjecting the original image of FIG. 1A to an encoding process including a frequency transform, the portion corresponding to the decoded image of a low resolution. As shown in FIG. 1B, some portions of the black lines are lacking, resulting in discontinuations of the lines.

In order to overcome such discontinuations or severings of the thin lines, one method may transform binary original image data into multivalued data, which is then input into the image encoding apparatus. For example, 1-bit pixel data representing either 0 or 1 is transformed into 8-bit pixel data representing any of the values from 0 to 255, and the 8-bit pixel data is then encoded. In this way, intermediate values that cannot be represented by the 1 bit can be taken in the coefficient data space. Thus, the eliminated parts of the thin lines can be represented by the intermediate values, although the image displayed upon reductive decoding becomes a multivalued gray image.

However, in this method, because the data of the original image, which is binary, is extended to multiple values, such as 256 values, the amount of code data that is generated increases, resulting in a significant increase in resources or the like required for decoding. Furthermore, when the frequency transform is repeated in a hierarchical manner, such as in the case of wavelet transform, the severing of thin lines occurs in the case of unique multiple values, such as the 256 values, as the hierarchy progresses from one layer to another.

Thus, in accordance with the present embodiment, binary original image data may be transformed into multivalued data in accordance with the number of the layers in the hierarchy of the frequency transform, such as a wavelet transform, before the data is processed. Further, the dynamic range of output values of the coefficient data for a low-frequency component of each layer may be increased before the next layer is processed. In addition, a background pixel value may be designated, and when the background pixel value is 1, the pixel values in the image may be inverted before the encoding process is performed.

In accordance with the present embodiment, the dynamic range of original image pixel data is increased depending on the dynamic range of the original image and the number of layers of the frequency transform. The severing of thin lines occurs not just in the case of binary but also in the case of quarternary or hexadecimal pixel data, depending on the type of frequency transform filter and the number of layers. Thus, in the present embodiment, the dynamic range is controlled depending on the number of layers in the hierarchy of the frequency transform even when the pixel data has less than or more than 256 gray levels.

(Application to Jpeg 2000)

In the present embodiment, the wavelet transform process according to JPEG 2000 may be performed for the frequency transform process. In the following, a description is given of an example of wavelet transform process according to JPEG 2000 in which a 5/3 filter is used. The wavelet transform using the 5/3 filter is a reversible transform, whereby a one-dimensional reversible discreet wavelet transform is performed in each of the horizontal and vertical directions. For the wavelet transform calculations, a lifting operation may be employed in which computation is saved by taking into consideration the downsampling after the discreet wavelet transform. The lifting operation is given by the following equations (1) and (2). The obtained result is the same when no lifting is used.

(1) Signal obtained by downsampling a high-pass filter output at 2:1:

$$Y(2n+1) = X_{ext}(2n+1) - \left\lfloor \frac{X_{ext}(2n) + X_{ext}(2n+2)}{2} \right\rfloor \quad (1)$$

(2) Signal obtained by downsampling a low-pass filter output at 2:1:

$$Y(2n) = X_{ext}(2n) + \left\lfloor \frac{Y(2n-1) + Y(2n+1) + 2}{4} \right\rfloor \quad (2)$$

where $X_{ext}$ is a signal after extending a one-dimensional input signal by mirroring in order to suppress the discontinuities when referring to pixels outside the tile boundary for smoothing, and n is an integer indicating the position of pixel data or coefficient data.

From Equation (1), an output obtained by downsampling a high-pass filter output can be determined. From Equation (2), which uses the output of Equation (1), an output obtained by downsampling a low-pass filter output can be determined.

Figures 2, 3:
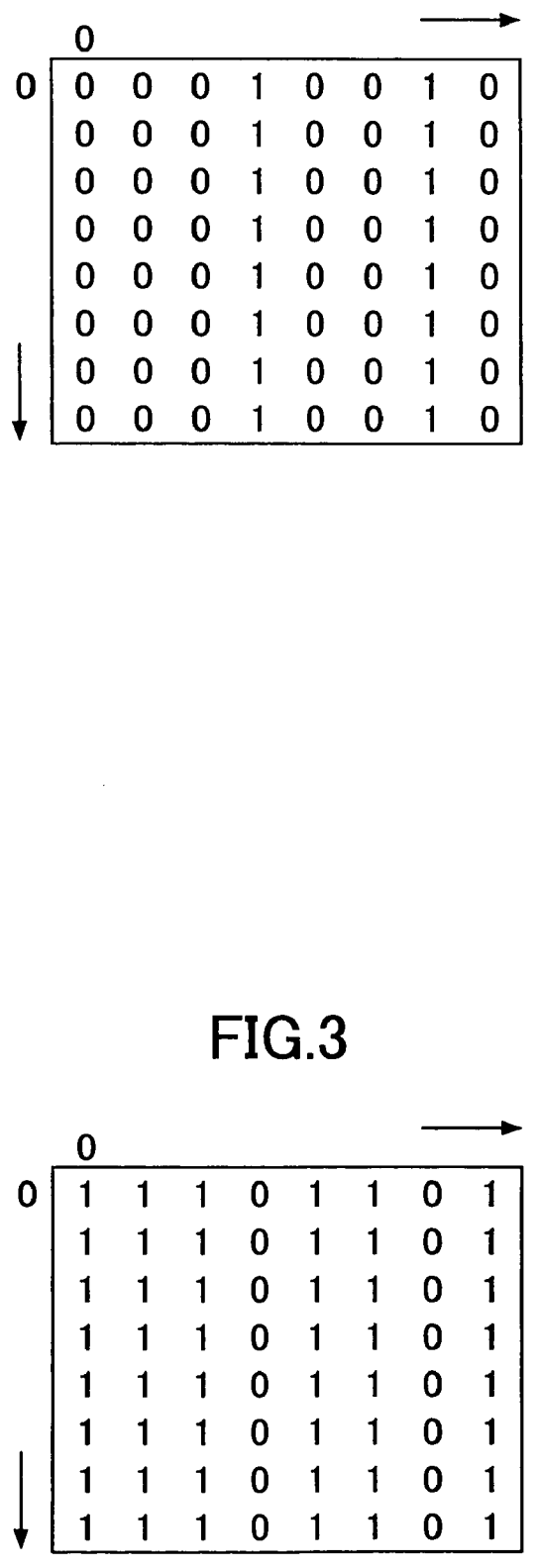

FIG. 2 shows an example of binary image. When thin lines are composed of pixels with the pixel value 1 as shown in FIG. 2, the pixels with odd-number coordinate values disappear in the low-frequency component, whereas the pixels of the thin lines that exist on the even-number coordinate values remain in the low-frequency component.

In order to eliminate the influence of the above, increasing the dynamic range of output is considered. For example, by increasing the dynamic range by 1 bit, the calculated values of the component that disappears remain. When displaying a reduced image of this component, the image may be transformed to black and white by a threshold process using the values obtained when the dynamic range was increased, in accordance with a predetermined rule, such as by carrying the value 5 in the case of 3 bits up to 7.

In the following, the influence of inverting an input data value is discussed. In the above calculation, if the thin lines are composed of pixels with the pixel value 0 as shown in FIG. 3, when the data is calculated in binary, not only the thin lines with odd-number coordinate values but also the thin lines with even-number coordinate values disappear from the low-frequency component.

This is due to the asymmetry of Equation (1). For the sake of simplicity, only the case is considered in which the thin lines are on the even-number coordinate values alone. Because the high-frequency component determined by Equation (1) is a predictive residual of the input signal, the high-frequency component is zero in a signal portion where there is no change. The "signal portion where there is no change" refers to a portion where pixels of the same value continue. In the case of a thin line with the pixel value of 0, the high-frequency component at adjacent positions is 1 and therefore the low-frequency component is 0. On the other hand, in the case of a thin line with the pixel value of 1, the high-frequency component of adjacent positions becomes 0, so that the low-frequency component becomes 1. Namely, when the thin line has the pixel value 0, no information remains in the low-frequency component in order to leave information in the high-frequency component, whereas when the thin line has the pixel value 1, no information remains in the high-frequency component while information remains in the low-frequency component.

It will be understood, therefore, that in order to display as much information about the thin line as possible upon reductive decoding, the pixel value 1, which enables more information to be left in the low-frequency component, should be allocated to the thin line while allocating zero as the background pixel value. These characteristics are unique to the discreet wavelet transform using the 5/3 filter.

(Increasing Dynamic Range)

Figure 4A:
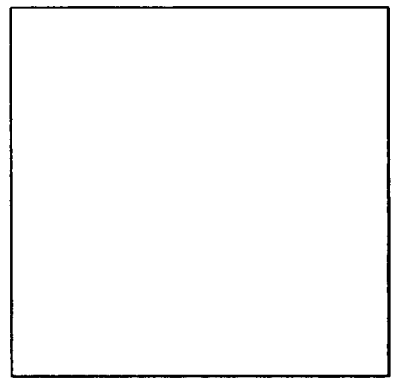
FIG. 4A through 4D illustrate a process of increasing a dynamic range according to an embodiment.

FIGS. 4A through 4D show how the dynamic range is increased in accordance with the present embodiment. FIG. 4A shows an original image. One bit is added below the least significant bit of the original image pixel data, in order to increase the dynamic range of the pixel data. The added bit may have the same value as the least significant bit, or a predetermined value may be used.

Figure 4B:
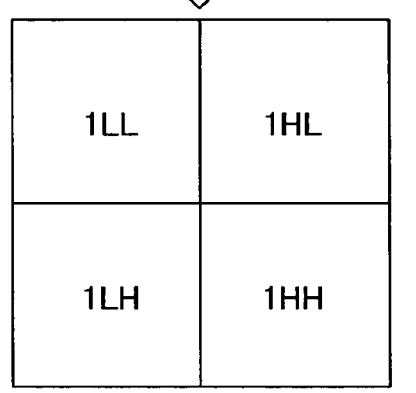

With reference to FIG. 4B, coefficient data obtained by frequency-transforming the original image with the increased dynamic range is described. In FIG. 4B, four components are generated by a two-dimensional frequency transform. These are an LL component, an HL component, an LH component, and an HH component. Each of the components in FIG. 4B consists of coefficient data obtained by performing a single frequency transform on the original image; thus, the components are referred to as "level 1" coefficient data.

Figure 4C:
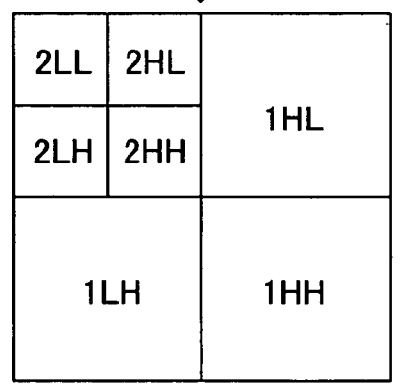

FIG. 4C shows coefficient data obtained by further performing a frequency transform on the LL component of FIG. 4B. In FIG. 4C, the components to which the numeral "2" is attached indicate the coefficient data obtained by the second frequency transform; thus, these components are referred to as "level 2" coefficient data. With regard to each of the level 2 components, the dynamic range is increased by adding one bit further below the least significant bit of the LL component of level 1. In this way, the loss of information due to a rounding process each time the frequency transform involving the rounding process is performed can be reduced.

Figure 4D:
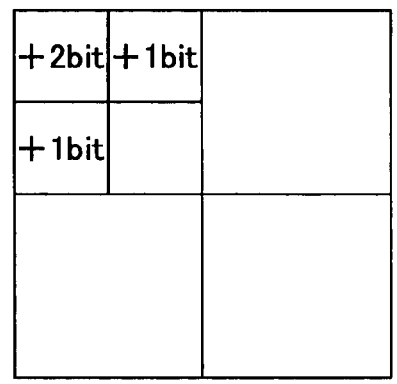

With reference to FIG. 4D, the increase in the number of bits of the coefficient data of level 2 with respect to the coefficient data of level 1 is described. In one frequency transform, the LL component is subjected to the low-pass filter process twice, i.e., once in the horizontal direction and then in the vertical direction. On the other hand, the LH component and the HL component are subjected to the low-pass filter process once, either in the horizontal direction or the vertical direction. Thus, the dynamic range of the LL component is increased by 2 bits, while the dynamic range of each of the HL component and the LH component is increased by 1 bit.

(Functional Structure of an Image Encoding Apparatus and an Image Decoding Apparatus)

FIG. 5 shows a functional structure of an image encoding apparatus 100 and an image decoding apparatus 200 according to the present embodiment. The image encoding apparatus 100 includes a dynamic range control unit 110, a frequency transform unit 120, an encoding unit 130, and a bit inversion unit 140.

The dynamic range control unit 110 is configured to increase the dynamic range of the pixel data of an image encoded by the image encoding apparatus 100. Thus, the loss of information in the original image from the coefficient data can be reduced when a rounding process is performed during frequency transform. The dynamic range control unit 110 is configured to increase the dynamic range of pixel data that is used when acquiring a low-frequency component.

Preferably, the dynamic range control unit 110 may increase the dynamic range of the coefficient data used in acquiring the low-frequency component on a layer by layer basis when the frequency transform process is performed on the generated coefficient data recursively. Preferably, the dynamic range control unit 110 may increase the dynamic range of the pixel data based on the number of the layers when the frequency transform process is performed on the generated coefficient data recursively.

The dynamic range control unit 110 may increase the dynamic range of the pixel data and the coefficient data by adding a bit below the least significant bit of the pixel data and the coefficient data.

The frequency transform unit 120 performs a frequency transform on input image to generate coefficient data composed of a high-frequency component and a low-frequency component. The frequency transform process performed by the frequency transform unit 120 includes a rounding process. Thus, when the bit length of the pixel data of the image on which the frequency transform process is performed is small, the loss of information due to the rounding process has a significant impact on the quality of a decoded image.

Preferably, the frequency transform unit 120 may perform the frequency transform on the coefficient data recursively to generate the coefficient data that is composed of the low-frequency component and the high-frequency component in a hierarchical manner. The frequency transform unit 120 may perform the frequency transform on the low-frequency component alone recursively.

The frequency transform unit 120 further performs a two-dimensional frequency transform in the horizontal direction and the vertical direction during a single frequency transform of the image and coefficient data. Thus, there may be generated the following four components: a horizontally low-frequency /vertically low-frequency component ("LL component"); a horizontally low-frequency/vertically high-frequency component ("HL component"); a horizontally high-frequency/vertically low-frequency component ("LH component"); and a horizontally high-frequency /vertically high-frequency component ("HH component").

When the frequency transform unit 120 performs the two-dimensional frequency transform, the frequency transform may be performed recursively on the LL component alone, or on the four components of the LL component, the HL component, the LH component, and the HH component. The frequency transform performed by the frequency transform unit 120 may be a wavelet transform. The recursive frequency transform may be realized by octave division.

The encoding unit 130 encodes the coefficient data generated by the frequency transform unit 120. The encoding unit 130 may reduce the data amount of the coefficient data by entropy encoding. The encoding unit 130 also generates code data that contains generated codes. The code data may be in a predetermined data format.

The code data may be composed of a plurality of packets, each of the packets having a header and a data body. When the frequency transform has been performed recursively, each packet includes the code of any one of the components in any one of the layers of the hierarchy in the frequency transform. Thus, when the image decoding apparatus 200 acquires a decoded image with a lower resolution than the original image, the decoding may be performed by selecting the packets of the layers necessary for acquiring the decoded image of the lower resolution. Thus, the processing can be simplified compared with the case where resolution is reduced after the entire code data is decoded.

The aforementioned predetermined data format may be a code stream format according to JPEG 2000.

The bit inversion unit 140 is configured to perform bit inversion on a pixel by pixel or coefficient by coefficient basis. The bit inversion unit 140 includes a pixel bit inversion unit 141 and a coefficient bit inversion unit 143. The pixel bit inversion unit 141 performs bit inversion on the pixel data of an image encoded by the image encoding apparatus 100. The coefficient bit inversion unit 143 performs bit inversion on the coefficient data generated by the frequency transform unit 120.

When a rounding process is performed during the frequency transform that generates the low-frequency component and the high-frequency component, information about the low-frequency component or the high-frequency component may be lost from the coefficient data. Thus, the bit inversion is performed by the bit inversion unit 140 so that information on the high- or low-frequency component side where the loss tends to occur more readily can be replaced with the bits on the other side where the loss tends to occur less readily.

The image decoding apparatus 200 may decode the code data generated by the image encoding apparatus 100. The image decoding apparatus 200 includes a dynamic range control unit 210, an inverse frequency transform unit 220, a decoding unit 230, and a bit inversion unit 240.

The decoding unit 230 analyzes the code data in accordance with its data format and decodes the codes contained in the code data, in order to acquire coefficient data. The decoding unit 230 may acquire the coefficient data by decoding an entropy code.

When the code data is composed of a plurality of packets, for example, and when a decoded image of a lower resolution than the original image is to be reproduced, the decoding unit 230 may perform the decoding by selecting those of the packets that correspond to the lower resolution. In this way, the processing can be simplified compared with the case where the resolution is reduced after the entire code data is decoded.

The inverse frequency transform unit 220 performs an inverse transform of the frequency transform on the coefficient data decoded by the decoding unit 230, so that pixel data can be acquired. When the coefficient data is composed in a hierarchical manner, and when the resolution of the decoded image is lower than the resolution of the original image, the inverse frequency transform unit 220 may perform the inverse transform process up to the layer corresponding to the resolution of the decoded image. The LL component of the corresponding layer is then considered the decoded image. In this way, the processing can be simplified compared with the case where the inverse frequency transform is performed on the entire layers.

The dynamic range control unit 210 controls the dynamic range of the coefficient data or pixel data processed by the inverse frequency transform unit 220 by eliminating one or more of the bits on the least significant bit side. Specifically, the dynamic range control unit 210 eliminates one or more bits corresponding to the one or more bits added at the time of generating the code data.

For example, when a bit was added each time the frequency transform process was performed, the dynamic range control unit 210 eliminates the added bit each time an inverse frequency transform process is performed. When the frequency transform process was performed after a number of bits were added to the pixel data based on the number of times of the frequency transform process performed, for example, the dynamic range control unit 210 eliminates the added bits from the pixel data of the decoded image. In another example, in the case of reductive decoding, the bits added to the layers necessary for acquiring a decoded image may be eliminated from the pixel data of the decoded image.

The bit inversion unit 240 performs bit inversion on the coefficient data to be transformed by the inverse frequency transform unit 220, the coefficient data transformed by the inverse frequency transform unit 220, and/or the pixel data acquired by the inverse frequency transform unit 220.

The bit inversion unit 240 includes a pixel bit inversion unit 241 and a coefficient bit inversion unit 243. The pixel bit inversion unit 241 performs bit inversion on the pixel data acquired by the inverse frequency transform unit 220 on a pixel by pixel basis. The coefficient bit inversion unit 243 performs bit inversion on the coefficient data acquired by the inverse frequency transform unit 220 on a coefficient by coefficient basis.

Example 1 of Process for Generating Code Data

Figure 6:
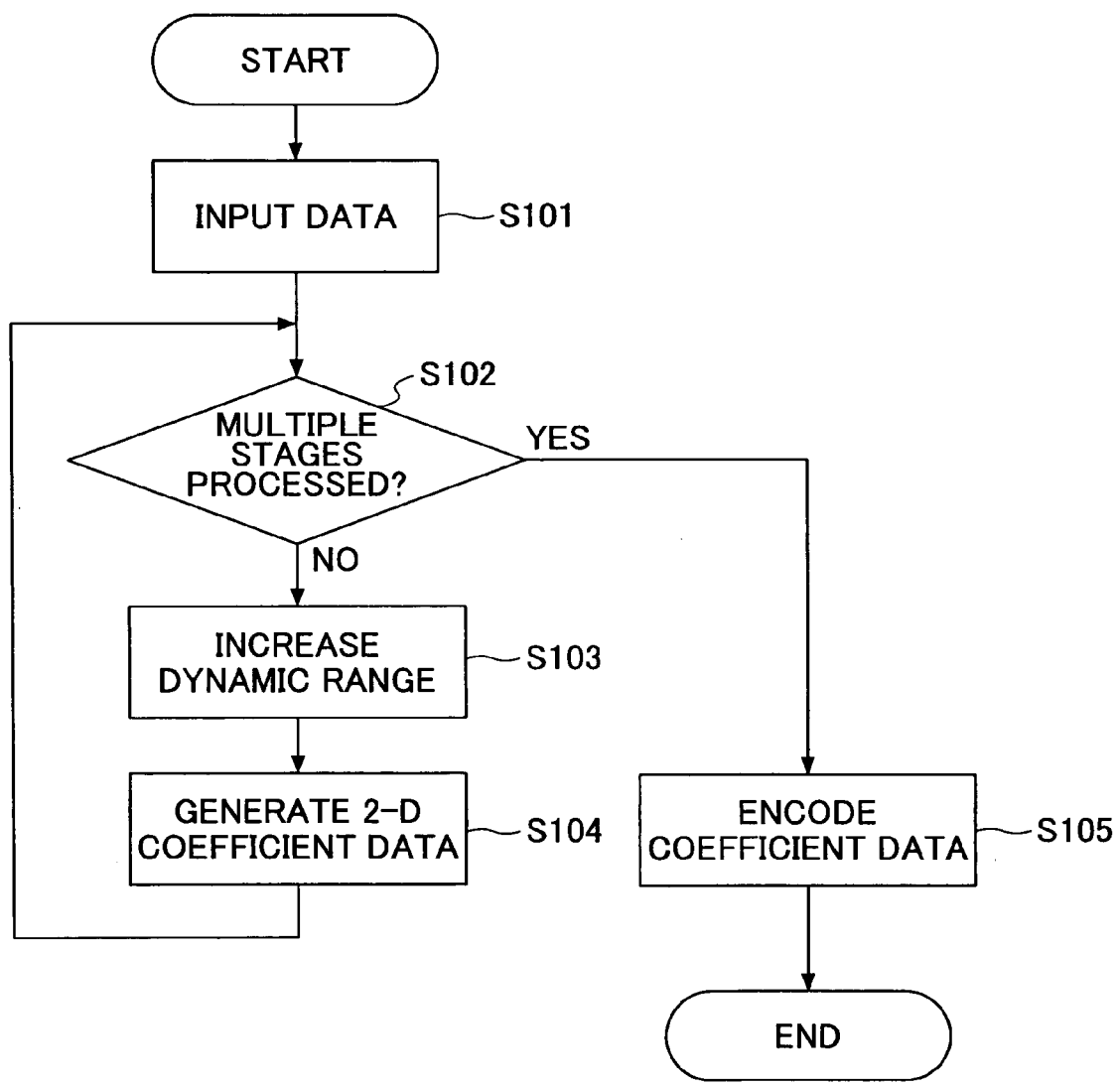
FIG. 6 shows a flow diagram of a process of generating code data according to an embodiment in which a dynamic range is increased on the input side.

FIG. 6 shows a flow diagram of an example of a process for generating code data.

In step S101, image data is input to the image encoding apparatus 100. The image data may be binary or multivalued image data. In step S102, it is determined whether the frequency transform process has been performed for a predetermined number of layers. For example, when the wavelet transform process is performed repeatedly, it is determined whether the wavelet transform process has been performed for a predetermined number of times. If the predetermined number of stages have been completed, the routine proceeds to step S105. If not, the routine proceeds to step S103.

In step S103, the dynamic range control unit 110 adds a bit to the pixel data for generating a low-frequency component in order to increase the dynamic range in a manner corresponding to the next frequency transform process. Through such processing, the influence of rounding of the calculated values by the thin line process on the LL image, for example, can be absorbed. Thus, image degradation at the time of reductive decoding, such as the severing of thin lines, can be reduced.

In step S104, the frequency transform unit 120 performs a two-dimensional frequency transform process on the pixel data or coefficient data in order to generate a low-frequency component and a high-frequency component. More specifically, the LL component, the HL component, the LH component, and the HH component are generated. For example, a reversible encoding using a 5/3 filter in accordance with JPEG 2000 is performed. After step S104, the routine returns to step S102 to repeat the above processes.

On the other hand, in step S105 following step S102, the coefficient data acquired in step S104 is encoded to generate code data, which may be in accordance with the JPEG 2000 standard, such as the JPC format.

Example 2 of Process for Generating Code Data

Figure 7:
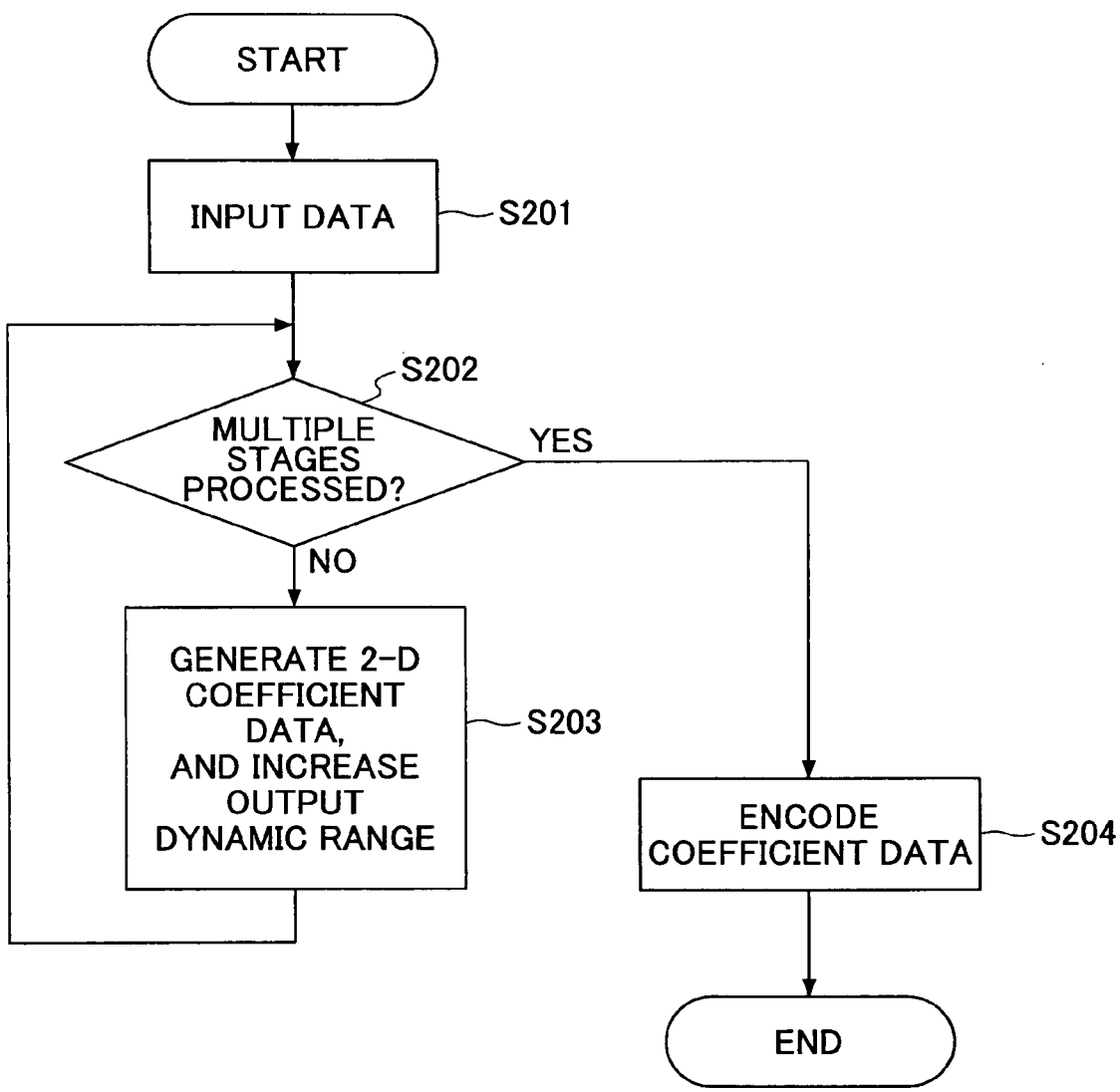
FIG. 7 shows a flow diagram of the process of generating code data according to another embodiment, in which the dynamic range is increased on the output side.

FIG. 7 shows a flow diagram of another example of a process for generating code data. Example 2 of FIG. 7 differs from Example 1 of FIG. 6 in step 203, which corresponds to steps S103 and S104 of Example 1. The other steps of Example 2 are identical to the corresponding steps of Example 1 and are therefore not described.

In steps S103 and S104 of Example 1, when the coefficient data or pixel data is frequency-transformed, the dynamic range is increased on the input side of the frequency transform. On the other hand, in step S203 of Example 2, the dynamic range is increased on the output side of the frequency transform process by which the coefficient data is generated.

Example 3 of Process for Generating Code Data

Figure 8:
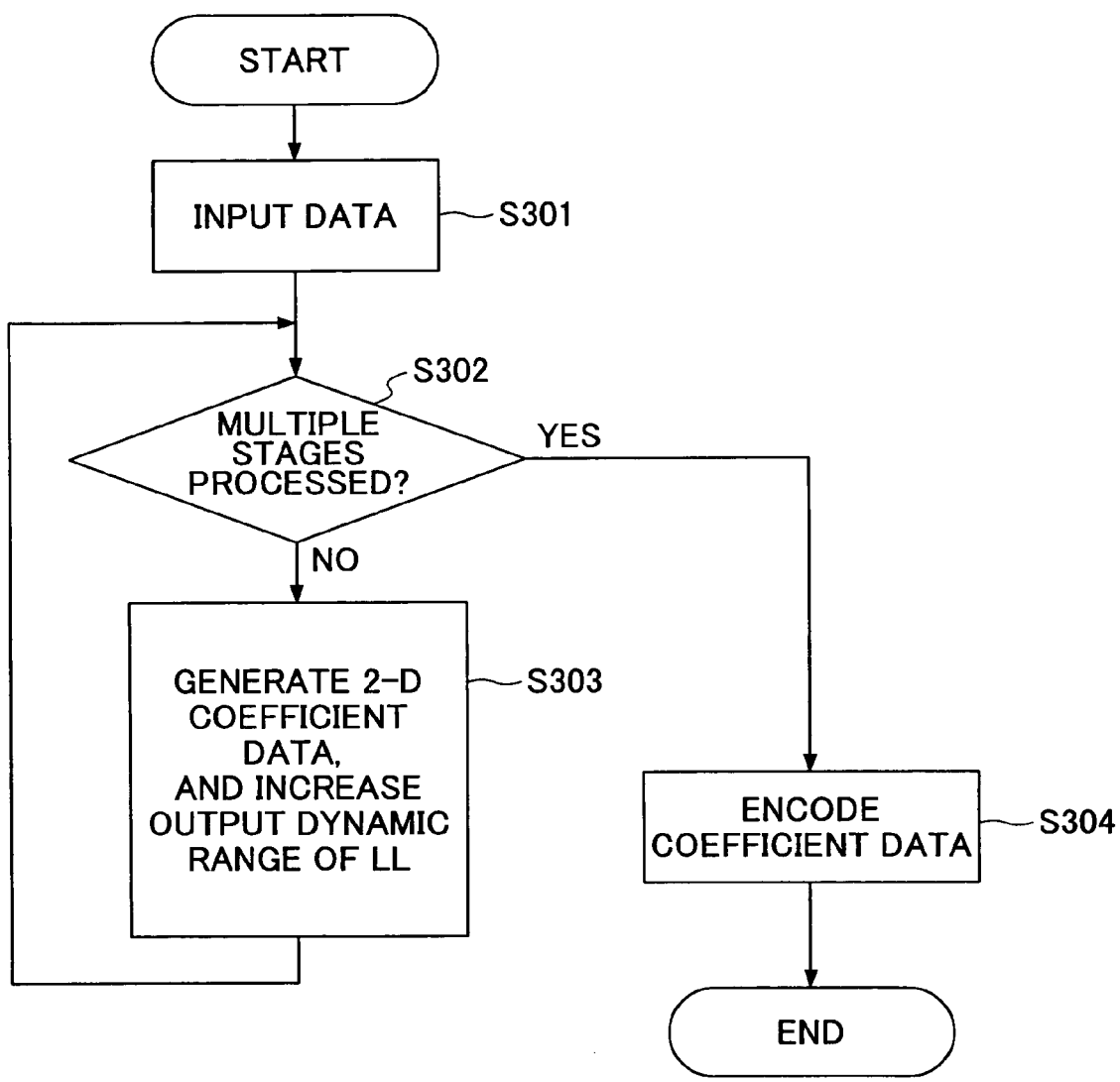
FIG. 8 shows a flow diagram of the process of generating code data according to another embodiment, in which the dynamic range of an LL component is increased.

FIG. 8 shows a flow diagram of yet another example of the process for generating code data. In FIG. 8, step S303 differs from its corresponding step S203 of Example 2 shown in FIG. 7. The other steps are the same and therefore their description is omitted.

In step S303 of FIG. 8, the dynamic range is increased on the output side of the frequency transform process for generating the coefficient data with regard to the LL component alone. With regard to the LH component and the HL component, the coefficient data is generated without increasing their bit numbers. In this way, the loss of information in the LL component, which greatly affects the decoded image quality, can be prevented. Further, the data amount of code data can be reduced compared with the case where the dynamic range of the LH component and the HL component is increased.

Example 4 of Process for Generating Code Data

Figure 9:
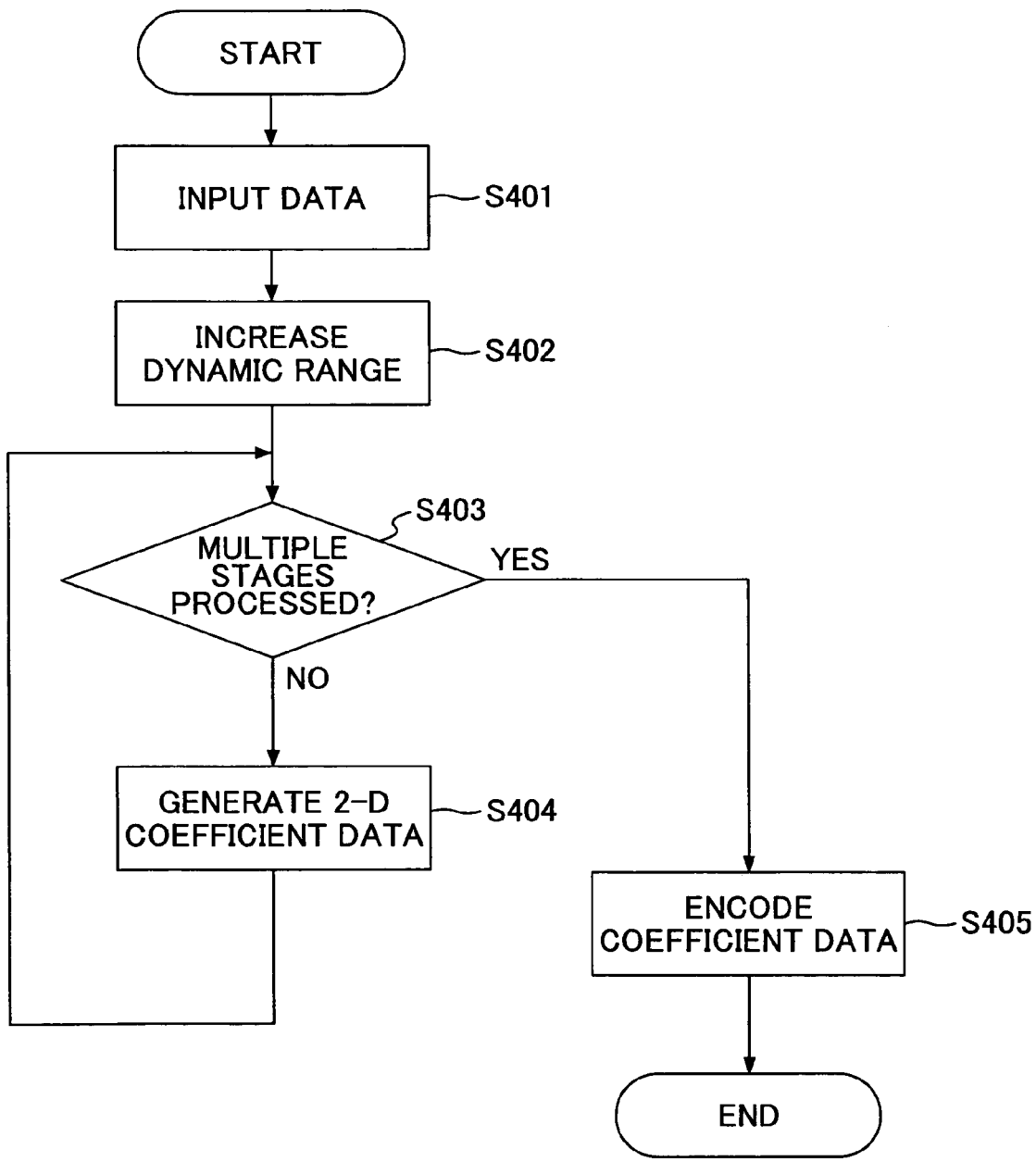
FIG. 9 shows a flow diagram of the process of generating code data according to yet another embodiment, in which the dynamic range of pixel data is increased.

FIG. 9 shows a flow diagram of Example 4 of the process for generating code data. In Example 4, the dynamic range of pixel data is increased depending on the number of times of the frequency transform process performed.

In Example 4 shown in FIG. 9, step S402, which corresponds to step S103 of Example 1 shown in FIG. 6, is performed following step S401. The other steps are the same as their corresponding steps of Example 1, and their description is therefore omitted.

In step S402, one or more bits are added to the input pixel data by the dynamic range control unit 110. The number of bits added may be based on the number of times of the frequency transform process by which two-dimensional coefficient data is generated, and the number of bits of the pixel data processed. The number of bits added may be further based on the performance of the filter for outputting the low-frequency component during the frequency transform process. In this way, the loss of information that tends to be caused by the low-pass filter can be reduced by increasing the number of bits.

For example, when the frequency transform process is performed up to level 3, three bits may be added below the least significant bit of the pixel data.

Example 5 of Process for Generating Code Data

Figure 10:
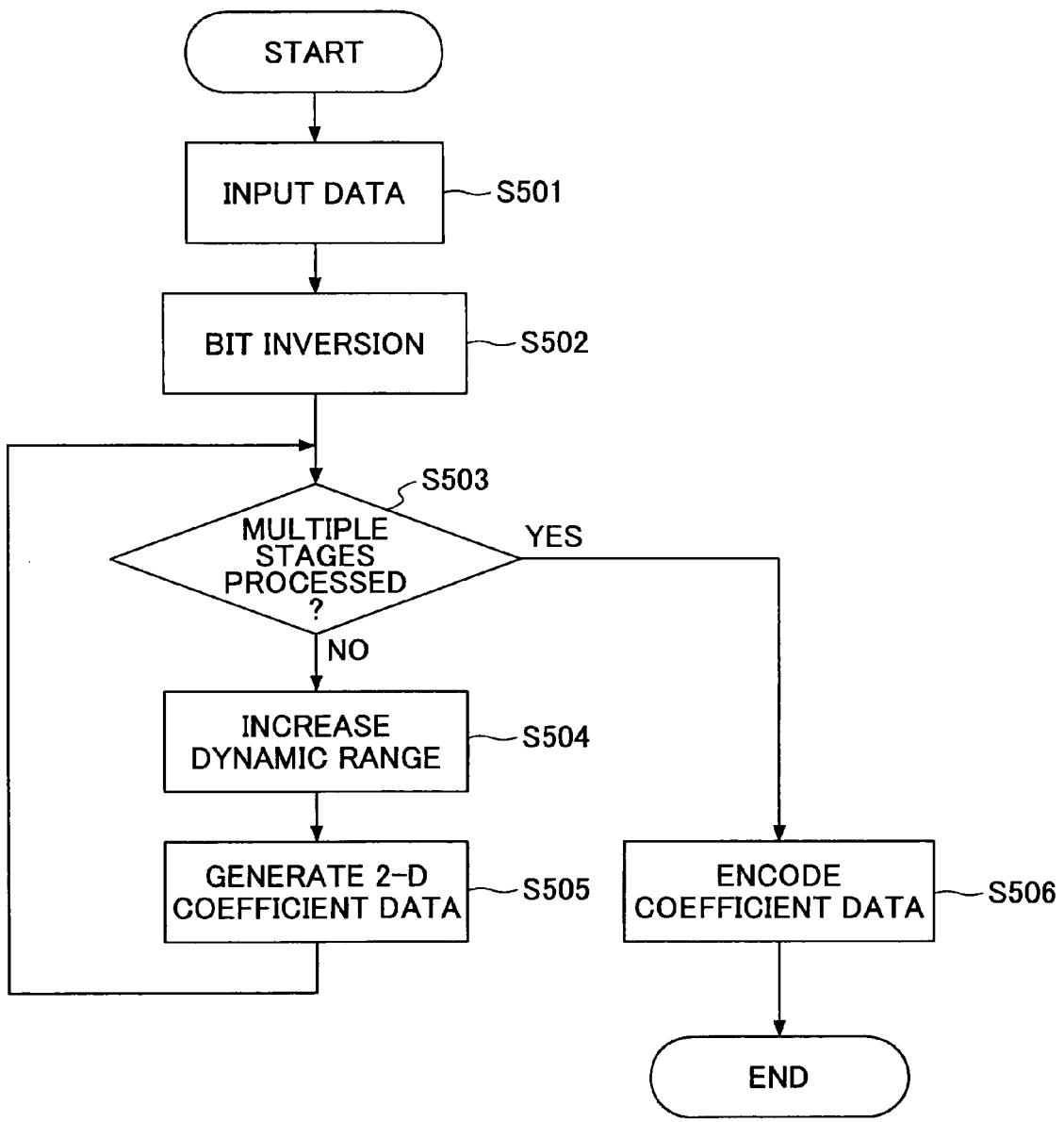
FIG. 10 shows a flow diagram of the process of generating code data according to another embodiment, in which pixel data is bit-inverted.

FIG. 10 shows a flow diagram of the process for generating code data according to Example 5. Step S501 of FIG. 10 is the same as step S101 of Example 1 shown in FIG. 6, and steps S503 through S506 of FIG. 10 are the same as steps S102 through S105 of Example 1. Thus, the description of the identical steps is omitted. Example 5 of FIG. 10 differs from Example 1 of FIG. 6 in that step S502 is provided between steps S501 and S503.

In step S502 of FIG. 10, bit inversion is performed on the input image data on a pixel by pixel basis. Thus, when a thin line portion has the value 0 and a background portion has the value 1, the loss of information about the thin line portion in the low-frequency component during the frequency transform process can be reduced. More specifically, because the thin line portion has the value 1 and the background portion has the value 0 due to bit inversion, more of the information about the thin line portion is contained in the coefficient data.

Alternatively, step S203 of FIG. 7 or step S303 of FIG. 8 may be performed instead of steps S504 and S505 of FIG. 10.

Example 6 of Process for Generating Code Data

Figure 11:
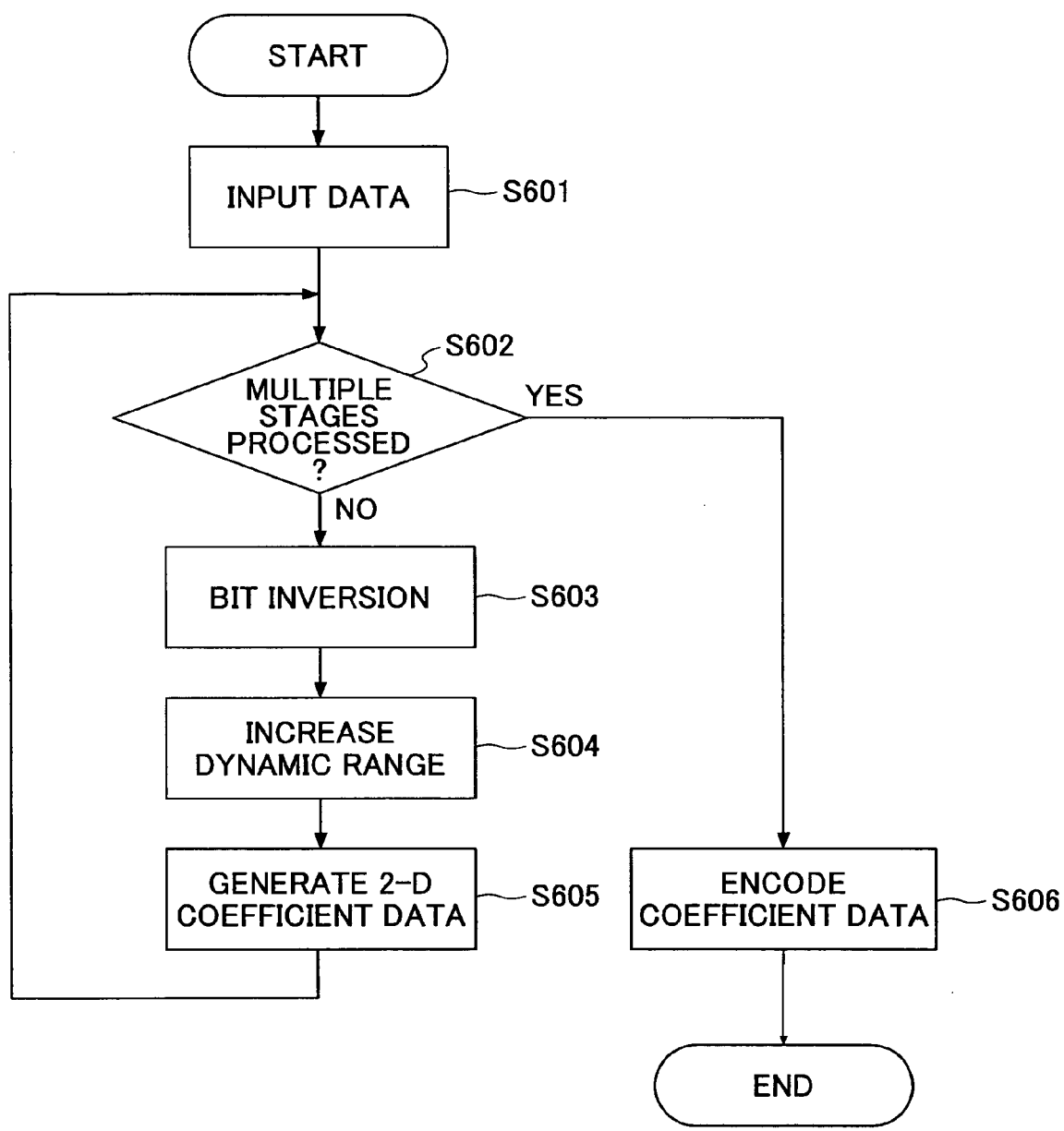
FIG. 11 shows a flow diagram of the process of generating code data according to another embodiment, in which pixel data and coefficient data are bit-inverted.

FIG. 11 shows a flow diagram of the process for generating code data according to Example 6. In Example 6 shown in FIG. 11, bit inversion is performed as in Example 5 of FIG. 10. Step S603 of FIG. 11 in which bit inversion is performed is provided prior to the step of determining the coefficient data for each layer. The other steps are the same as their corresponding steps of FIG. 10, and their description is therefore omitted.

In step S603 of FIG. 11, bit inversion is performed on the pixel data or coefficient data prior to the increase in the dynamic range by the dynamic range control unit 110. Thus, bit inversion is performed on the coefficient data each time the frequency transform process is performed.

When the frequency transform process is performed in a hierarchical manner, information about a thin line or the like is lost as the hierarchy progresses from one layer to another.

Thus, in the previous Example 5 shown in FIG. 10, the input pixel data is subjected to bit inversion in order to cause a thin line portion to have the value of the low-frequency side, so that the loss of information can be reduced. However, when the thin line portion is changed to the low-frequency value, the background portion assumes the value of the high-frequency side. When the frequency transform process is performed in a hierarchical manner, the information about the background portion is lost in the low-frequency component as the hierarchy proceeds from one layer to another. As a result, the thin line portion becomes enlarged or thicker.

Thus, in Example 6, the bit inversion is performed on each layer that is subjected to the frequency transform process, so that the low-frequency side and the high-frequency side can be exchanged between the thin line portion and the background portion. Thus, the loss of information for either side that occurs as the hierarchy progress from one layer to another can be reduced.

(Code Data)

Figure 12:
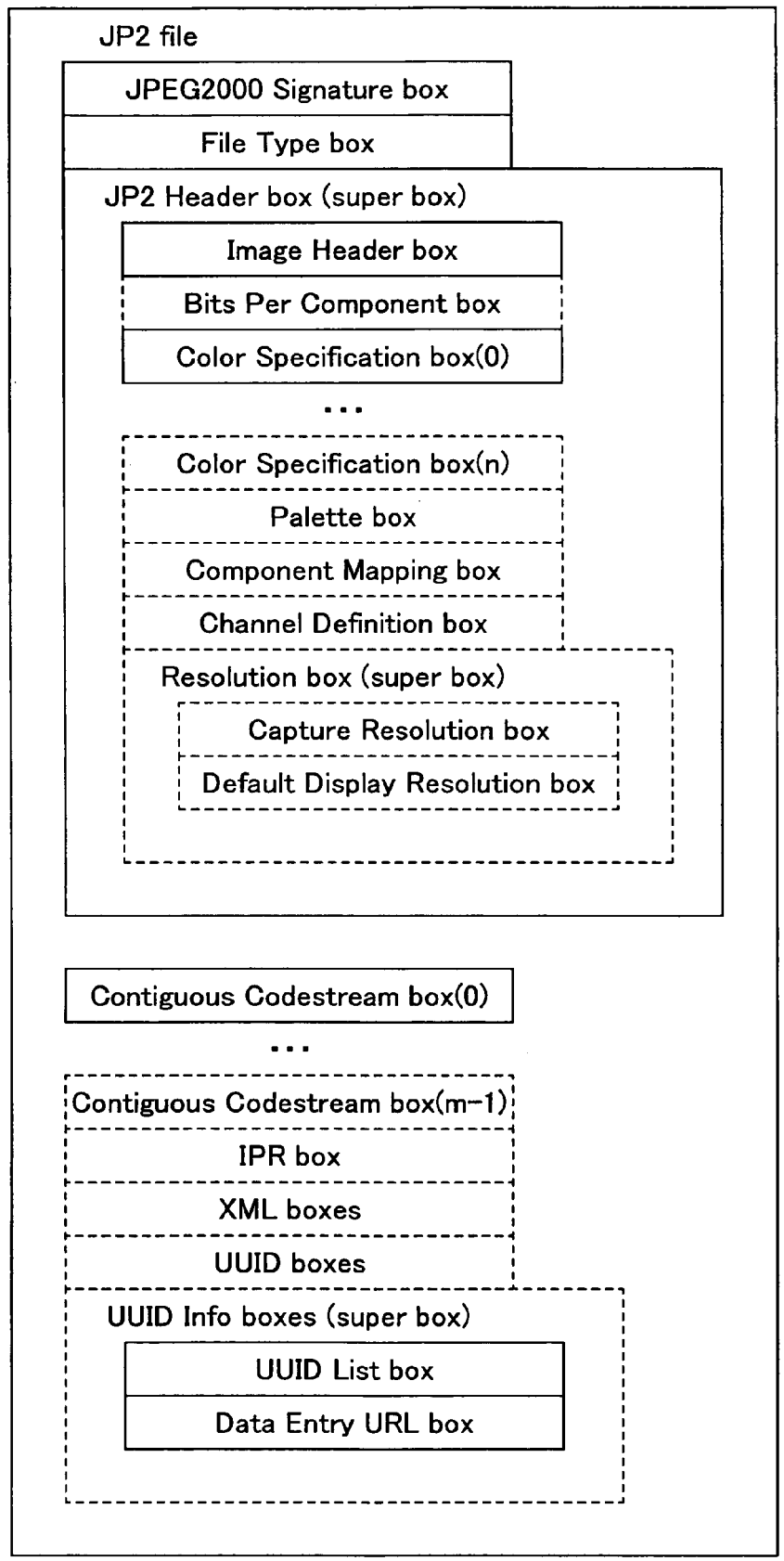
FIG. 12 shows an example of a JP2 file of JPEG 2000.

FIG. 12 shows an example of a JP2 file of JPEG 2000 containing code data generated by the image encoding apparatus 100. The JP2 file is generated by a code data generating unit 150. JP2 is a file format that has multiple image-representing code streams. The file format also enables the addition of information about meta data, image features, intellectual property right, vendor, and color profile, for example.

The JP2 file has a structural unit called "box". A pallet box is used for generating a channel from a certain component, and it represents a corresponding relationship for transforming a color index to an actual color (such as the values of R, G, and B).

Figure 13:
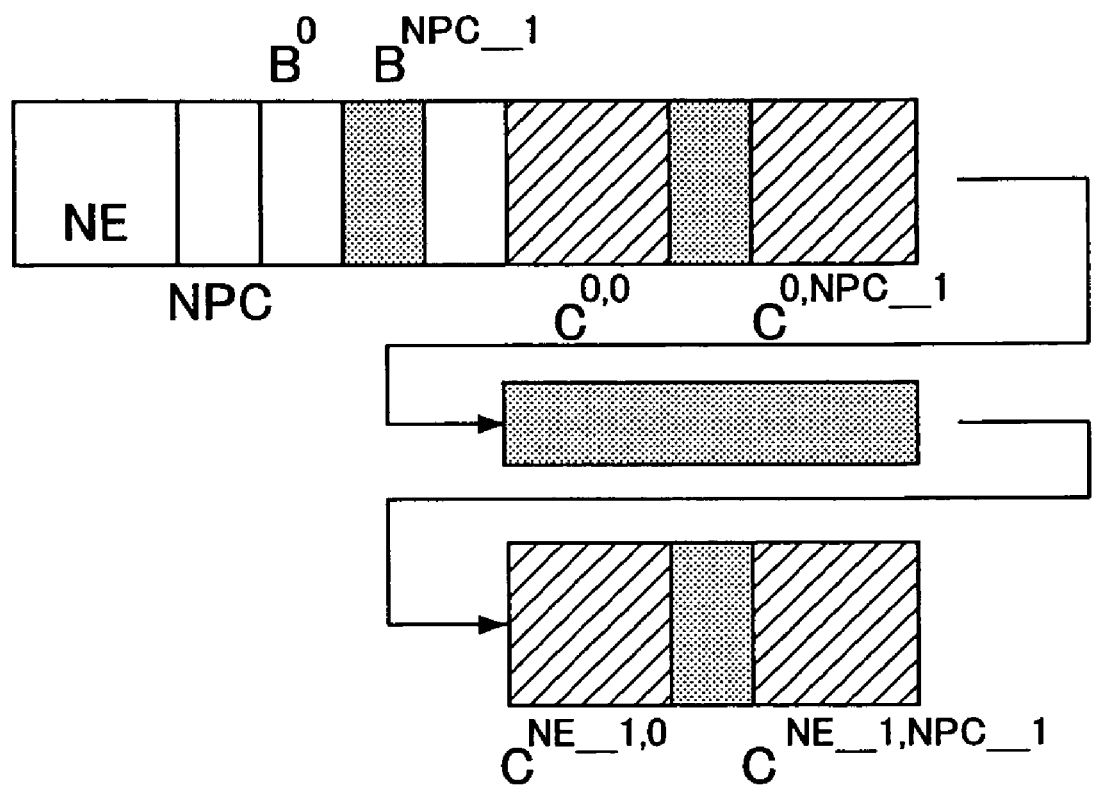
FIG. 13 shows a structure of a pallet box.

With reference to FIG. 13, a pallet box is described. The pallet box shown in FIG. 13 includes "NE" indicating the number of table entries, i.e., indexes, "NPC" indicating the number of elements of which the color space of a palette is composed, "Bi" indicating the bit depth of a palette set number i, and a value Cji of a color space number j of a palette set number i.

When palette data of a binary image is described in the pallet box, NE is 2, and, since the binary index is transformed to a monochrome image, NPC is 1. When the background pixel value is designated to be 0, the palette of index 0 becomes 0, and index 1 becomes palette 1. Conversely, when the background pixel value is designated to be 1, because pixel 1 is substituted by index 0 by inversion prior to encoding, the palette of index 1 becomes 0 and the palette of index 0 becomes 1.

In another example, when a binary index is transformed into the full colors of RGB, NPC is 3 and the palette set may be (R0, G0, B0)=(0, 0, 0) and (R1, G1, B1)=(255, 255, 255).

In Part 1 and Part 6 of JPEG 2000, a bi-level color space is defined. In this color space, there is a mode in which value 0 represents white and value 1 represents black, and another mode in which the values of white and black are opposite. The above-described system can also be realized using the black and white color system of this binary space.

The code data generated in accordance with the present embodiment enables the presentation of a good image in the same colors as the original image in which the severing of thin lines is minimized, even when displayed on a viewer with a conventional JPEG 2000 decoder, either at the same size as the original image or at a reduced size.

(Implementation by Computer and the Like)

The image encoding apparatus 100 and/or the image decoding apparatus 200 may be realized with a personal computer (PC). The operations and processes of the foregoing embodiments may be executed or performed by a CPU in accordance with a program stored in a ROM or a hard disk drive, using a main memory such as a RAM as a work area.

Although this invention has been described in detail with reference to certain embodiments, variations and modifications exist within the scope and spirit of the invention as described and defined in the following claims.

The present application is based on the Japanese Priority Application No. 2007-330709 filed Dec. 21, 2007, the entire contents of which are hereby incorporated by reference.

What is claimed is:

1. An image encoding apparatus comprising:
   a frequency transform unit configured to perform a frequency transform on an image to generate coefficient data having a low-frequency component and a high-frequency component;
   a dynamic range control unit configured to add a bit on a least significant bit end of a portion of pixel data of the image that is used for generating the coefficient data of the low-frequency component on a pixel by pixel basis, in order to increase a dynamic range of the pixel data for the low-frequency component; and
   an encoding unit configured to encode the coefficient data generated by the frequency transform unit,
   wherein the addition of the bit on the least significant bit end of the portion of pixel data of the image is before performance of the frequency transform.

2. The image encoding apparatus according to claim 1, wherein the frequency transform unit performs the frequency transform repeatedly on the low-frequency component, or the low-frequency component and the high-frequency component, in order to generate the coefficient data in which the low-frequency component and the high-frequency component are composed in a hierarchical manner,
   and wherein the dynamic range control unit adds a bit at the least significant bit end of coefficient data for the low-frequency component of a next layer on a coefficient by coefficient basis, the coefficient data being generated by the frequency transform performed by the frequency transform unit.

3. The image encoding apparatus according to claim 1, wherein the frequency transform unit performs the frequency transform repeatedly on the low-frequency component, or the low-frequency component and the high-frequency component, in order to generate coefficient data in which the low-frequency component and the high-frequency component are composed in a hierarchical manner,
   wherein the dynamic range control unit increases the dynamic range of the pixel data based on the number of times the frequency transform is performed by the frequency transform unit and a bit length of the pixel data.

4. The image encoding apparatus according to claim 2, further comprising:
   a coefficient bit inversion unit configured to subject the coefficient data for the low-frequency component, or the coefficient data for the low-frequency component and the high-frequency component, to a bit inversion,
   wherein the frequency transform unit performs the frequency transform on a component comprising the coefficient data that is bit-inverted by the coefficient bit inversion unit.

5. The image encoding apparatus according to claim 1, comprising a pixel bit inversion unit configured to bit-invert the pixel data,
   wherein the frequency transform unit performs the frequency transform on an image composed of the pixel data bit-inverted by the pixel bit inversion unit.

6. The image encoding apparatus according to claim 1, wherein the frequency transform unit performs the frequency transform in a horizontal direction and a vertical direction in one frequency transform, in order to generate a horizontally low-frequency /vertically low-frequency component, a horizontally low-frequency/vertically high-frequency component, a horizontally high-frequency/vertically low-frequency component, and a horizontally high-frequency /vertically high-frequency component.

7. The image encoding apparatus according to claim 1, wherein the image includes a binary image, or wherein the dynamic range of the pixel data of the image is 16 or less.

8. An image encoding method comprising:
a frequency transform step of generating coefficient data having a low-frequency component and a high-frequency component by performing a frequency transform on an image;
a dynamic range increasing step of adding a bit on a least significant bit end of a portion of pixel data of the image that is used for generating the coefficient data of the low-frequency component on a pixel by pixel basis, in order to increase a dynamic range of the pixel data for the low-frequency component; and
an encoding step of encoding the coefficient data generated by the frequency converting step,
wherein the adding of the bit on the least significant bit end of the portion of pixel data of the image is before performing the frequency transform.

9. The image encoding method according to claim 8, comprising repeating the frequency transform step on the low-frequency component, or the low-frequency component and the high-frequency component that are generated in the frequency transform step, in order to generate the coefficient data in which the low-frequency component and the high-frequency component are composed in a hierarchical manner,
wherein the dynamic range increasing step includes adding a bit at the least significant bit end of coefficient data for the low-frequency component of a next layer on a coefficient by coefficient basis, the coefficient data being generated by the frequency transform performed in the frequency transforming step.

10. The image encoding method according to claim 8, wherein the frequency transform is repeatedly performed on the low-frequency component, or the low-frequency component and the high-frequency component that are generated in the frequency transform step, in order to generate the coefficient data in which the low-frequency component and the high-frequency component are composed in a hierarchical manner,
wherein the dynamic range increasing step includes increasing the dynamic range of the pixel data based on the number of times the frequency transform is performed in the frequency transforming step and a bit length of the pixel data.

11. The image encoding method according to claim 8, comprising a coefficient bit inverting step of subjecting the coefficient data for the low-frequency component, or the coefficient data for the low-frequency component and the high-frequency component, to a bit inversion,
wherein the frequency transform step includes performing the frequency transform on a component comprising the coefficient data that is bit-inverted in the coefficient bit inverting step.

12. The image encoding method according to claim 8, comprising a pixel bit inverting step of bit-inverting the pixel data,
wherein the frequency transform step includes performing the frequency transform on an image composed of the pixel data bit-inverted in the pixel bit inverting step.

13. A non-transitory computer-readable recording medium storing a computer-readable program which, when executed by one or more processors of an information processing apparatus, carries out an image encoding method which comprises:
a frequency transform step of generating coefficient data having a low-frequency component and a high-frequency component by performing a frequency transform on an image;
a dynamic range increasing step of adding a bit on a least significant bit end of a portion of pixel data of the image that is used for generating the coefficient data of the low-frequency component on a pixel by pixel basis, in order to increase a dynamic range of the pixel data for the low-frequency component; and
an encoding step of encoding the coefficient data generated by the frequency converting step,
wherein the adding of the bit on the least significant bit end of the portion of pixel data of the image is before performing the frequency transform.

* * * * *